United States Patent [19]

Hoffman

[11] 4,431,754

[45] Feb. 14, 1984

[54] LOW VISCOSITY POLYMER POLYOLS VIA DILUTION

[75] Inventor: Dwight K. Hoffman, Midland, Mich.

[73] Assignee: The Dow Chemical Company, Midland, Mich.

[21] Appl. No.: 353,709

[22] Filed: Mar. 1, 1982

[51] Int. Cl.³ .................. C08G 18/14; C08G 18/63
[52] U.S. Cl. ................... 521/137; 524/565; 524/566; 524/567; 524/568; 524/569; 524/575; 524/762; 528/75
[58] Field of Search ............. 521/137; 528/75; 524/762, 565–569, 575

[56] References Cited

U.S. PATENT DOCUMENTS

| | | | |
|---|---|---|---|
| 3,304,273 | 2/1967 | Stamberger | 521/137 |
| 3,823,201 | 7/1974 | Pizzini et al. | 521/137 |
| 3,928,299 | 12/1975 | Rosenkrauz et al. | 521/137 |
| 4,041,105 | 8/1977 | O'Shea et al. | 521/137 |
| 4,049,636 | 9/1977 | Mao et al. | 528/75 |
| 4,108,954 | 8/1978 | Hilterhaus et al. | 264/216 |
| 4,111,865 | 9/1978 | Seefried et al. | 521/137 |
| 4,161,468 | 7/1979 | Davis et al. | 521/137 |
| 4,166,889 | 9/1979 | Fujii et al. | 521/55 |
| 4,208,314 | 6/1980 | Priest et al. | 521/137 |
| 4,226,756 | 10/1980 | Critchfield et al. | 521/137 |

*Primary Examiner*—Lester L. Lee
*Attorney, Agent, or Firm*—Jeffrey S. Boone

[57] ABSTRACT

A low viscosity copolymer polyahl dispersion is prepared by polymerizing polymer particles in a polyahl medium, to a first solids concentration and thereafter diluting the dispersion to a second lower solids concentration. The resulting diluted dispersion has a lower viscosity than if the dispersion were prepared directly at the lower solids level. The invention has particular advantage when used with "all acrylonitrile" dispersions. The copolymer polyahl dispersions are useful in the manufacture of urethane and isocyanurate foams.

16 Claims, No Drawings

LOW VISCOSITY POLYMER POLYOLS VIA DILUTION

BACKGROUND OF THE INVENTION

The present invention relates to copolymer dispersions (copolymer polyols) having excellent stability and low viscosity, and to polyurethanes prepared by reacting these dispersions with reactive polyisocyanates.

Polyurethanes constitute a broad class of polymeric materials having a wide range of physical characteristics. The polymers are produced by the reaction of a polyisocyanate with a polyfunctional compound having an active hydrogen in its structure. This active hydrogen compound is generally a liquid or solid capable of being melted at a relatively low temperature. Most commonly, the active hydrogen compound contains hydroxyl groups as the moieties having the active hydrogen and thus are termed "polyols," e.g., the polyols of polyesters, polyamides, polyethers, or mixtures of two or more of such materials.

Although a wide variety of physical and chemical properties are obtainable by the proper selection of a polyisocyanate and the polyol as well as the conditions under which the polyurethane reaction is carried out, the resulting polyurethane often exhibits properties, for example, load bearing and processability, unacceptable for some applications.

To improve such properties, it has been the practice of the art to employ graft copolymer dispersions (often called "copolymer polyols or polymer polyols") prepared from vinyl monomers and polyols as shown in U.S. Pat. Nos. 3,383,351; 3,304,273; 3,523,093; 3,652,639 and 3,823,201. In 3,304,273, a mixture of styrene and a polar monomer are copolymerized while dispersed in a polyol which is essentially free of ethylenic unsaturation. Unfortunately, stable dispersions cannot be prepared by this technique if high proportions of styrene monomer are employed. Subsequently, in order to overcome this problem, it was found desirable to employ polyols which contain a significant amount of ethylenic unsaturation. As is shown in U.S. Pat. No. 3,823,201, such unsaturation is advantageously introduced by reacting the polyol with an organic compound having both ethylenic unsaturation and hydroxyl, carboxyl or epoxy moieties which are reactive with the active hydrogen moiety of the polyol.

While these improved graft copolymer dispersions solve many of the problems confronting the polyurethane art, other significant problems remain. Specifically, having a low viscosity polymer polyol is an important factor for urethane processing. Low viscosity allows greater loading of solids in the dispersion so that greater reinforcement is obtained in the final product. Low viscosity can also mean better mixing so that a more uniform product is obtained, shorter cycle times are required, and less expensive mixing equipment is needed. Compounding the problem of viscosity is the fact that added unsaturation, which is introduced to the polyol for colloidal stability, can significantly increase viscosity. In high solids formulations, the addition of highly reactive vinyl double bonds to the polyol can cause unworkable viscosities. Viscosity is more of a problem with "all acrylonitrile" dispersions than with styrene-acrylontrile dispersions. Indeed, in some instances dispersions having particles polymerized from essentially only acrylonitrile (or similar monomers) are so viscous as to be useless in many applications.

Accordingly, it would be highly desirable to provide an improved copolymer dispersion which at a given percent solids has a low viscosity.

SUMMARY OF THE INVENTION

In one aspect the present invention is a method for making an improved copolymer dispersion which comprises addition polymerizing monomer dispersed in a polyahl medium to a first solids content and then diluting the dispersion obtained to a second lower solids content, thereby obtaining a dispersion having a lower viscosity than if the polymer dispersion was made directly at the second lower solids content. In another aspect, this invention is the polymer dispersion produced by the aforementioned method.

Surprisingly, the copolymer dispersions of the instant invention exhibit excellent stability and most importantly, have exceedingly low viscosities compared to similar polymer dispersions prepared at equal solids concentrations. Further, dispersions of the invention which are prepared with added unsaturation in the polyol have exceedingly low viscosities. Additionally, "all acrylonitrile" dispersions of the invention have unusually low viscosities.

DETAILED DESCRIPTION OF REPRESENTATIVE EMBODIMENTS

The polyahl suitably employed in the practice of this invention includes any polyfunctional compound having at least two active hydrogen moieties. For the purposes of this invention, an active hydrogen moiety refers to a moiety containing a hydrogen atom which, because of its position in the molecule, displays significant activity according to the Zerewitinoff test described by Woller in the *Journal of American Chemical Society*, Vol. 49, page 3181 (1927). Illustrative of such active hydrogen moieties are —COOH, —OH, —NH$_2$, —NH—, —CONH$_2$, —SH and —CONH—. Typical polyahls include polyols, polyamines, polyamides, polymercaptans and polyacids.

Of the foregoing polyahls, the polyols are preferred. Examples of such polyols are the polyol polyethers, the polyol polyesters, hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers including polythioethers, acetals including polyacetals, aliphatic and aromatic polyols and thiols including polythiols, ammonia and amines including aromatic, aliphatic and heterocyclic amines including polyamines as well as mixtures thereof. Alkylene oxide adducts of compounds which contain two or more different groups within the above-defined classes may also be used such as amino alcohols which contain an amino group and a hydroxyl group. Also alkylene adducts of compounds which contain one —SH group and one —OH group as well as those which contain an amino group and a —SH group may be used.

Polyether polyols which are most advantageously employed as the polyahl in the practice of this invention are the polyalkylene polyether polyols including the polymerization products of alkylene oxides and other oxiranes with water or polyhydric alcohols having from two to eight hydroxyl groups. Exemplary alcohols that are advantageously employed in making the polyether polyol include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, α-methyl glucoside, pentaerythritol, erythritol, pentatols and hexatols. Also included within the term "polyhydric alcohol" are sugars such as glucose, sucrose, fructose and maltose as well as compounds derived from phenols such as 2,2-(4,4'-hydroxyphenyl)propane, commonly known as bisphenol A. Illustrative oxiranes that are advantageously employed in the preparation of the polyether polyol include simple alkylene oxides such as ethylene oxide, propylene oxide, butylene oxide, and amylene oxide; glycidyl ethers such as t-butyl glycidyl ether and phenyl glycidyl ether; and random or block copolymers of two or more of these oxiranes. The polyalkylene polyether polyols may be prepared from other starting materials such as tetrahydrofuran and alkylene oxide-tetrahydrofuran copolymers; epihalohydrins such as epichlorohydrin; as well as arylalkylene oxides such as styrene oxide. The polyalkylene polyether polyols may have primary, secondary or tertiary hydroxyl groups and, preferably, are polyethers prepared from alkylene oxides having from two to six carbon atoms such as ethylene oxide, propylene oxide and butylene oxide. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951), or in U.S. Pat. No. 1,922,459. Also suitable are polyether polyols and processes for preparing them that are described in Schick, M. J., *Nonionic Surfactants*, Marcel Dekker, Inc., New York (1967), U.S. Pat. Nos. 2,891,073; 3,058,921; 2,871,219 and British Patent No. 898,306. Polyether polyols which are most preferred include the alkylene oxide addition products of water, trimethylolpropane, glycerine, pentaerythritol, sucrose, sorbitol, propylene glycol and blends thereof having hydroxyl equivalent weights of from about 250 to about 5000.

Polyhydric thioethers which are sometimes advantageously condensed with alkylene oxides include the reaction product of thiodiglycol with alkylene oxides or dihydric alcohols such as disclosed above.

Polyhydroxyl-containing phosphorus compounds which are optionally used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Polyacetals (acetal resins) which are optionally reacted with alkylene oxides or other oxiranes include the reaction product of formaldehyde or other suitable aldehyde with a polyhydric alcohol or an oxirane such as those disclosed above. Polyacetals derived from acetone or from cyclic acetals are also suitably employed.

Aliphatic and aromatic thiols which are optionally reacted with alkylene oxides and other oxiranes include alkane thiols such as 1,2-ethane dithiol, 1,2-propane dithiol and 1,6-hexane dithiol; alkene thiols such as 2-butene-1,4-dithiol; and alkyne thiols such as 3-hexyne-1,6-dithiol; and arene thiols such as 1,4-benzene dithiol. Other thiols suitable for this purpose are hydrogen sulfide as well as thio functional polymers such as polyvinylbenzyl thiol.

Acids and amides which are optionally reacted with alkylene oxides and other oxiranes include difunctional fatty acids such as hydroxystearic and dihydroxystearic acid as well as amides such as fatty acid alkanol amides, e.g., lauryl monoethanolamide; diacids such as adipic and terephthalic acid; sulfonamides and other acids and amides set forth in Schick, supra.

Amines which are optionally reacted with alkylene oxides and other oxiranes include aromatic amines such as aniline, o-chloroaniline, p-amino aniline, 1,5-diamino naphthalene, methylene dianiline, the condensation products of aniline and formaldehyde and 2,4-diamino toluene; aliphatic amines such as methylamine, triisopropanolamine, isopropanolamine, diisopropanolamine, ethylenediamine, 1,3-propylenediamine, 1,4-butylenediamine and 1,3-butylenediamine, mixtures thereof and the like.

Additional polyethers and methods for their preparation are set forth in Schick, supra.

Examples of suitable hydroxy-containing polyesters include those obtained from polycarboxylic acids and polyhydric alcohols. Examples of suitable polycarboxylic acids include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethlolpropane, 1,1,1-trimethylolethane, hexane-1,2,6-triol, α-methyl glucoside, pentaerythritol and sorbitol. Also included with the term "polyhydric alcohol" are compounds derived from phenols such as 2,2(4,4'-hydroxyphenyl)propane, commonly known as bisphenol A, bis(4,4'-hydroxyphenyl)sulfide and bis-(4,4'-hydroxyphenyl)sulfone.

Other polyahls suitably employed include polylactones; hydroxy functional acrylic polymers such as polymers of hydroxyethyl acrylate and hydroxypropyl acrylate; polyvinyl acetate and other polymers of vinyl acetate and other ethylenically unsaturated carboxylic acids; hydroxyl-containing epoxy resins; urea-formaldehyde and melamine-formaldehyde resins; hydroxyl-containing polycarbonates and polyurethanes; methylol resins; starches and other cellulosic polymers; esters of phosphoric, sulfonic, sulfuric and boric acid; and polypeptides.

In one embodiment, the copolymer-polyols of the invention are prepared without any added ethylenic unsaturation in the polyahl. That is, discrete particles are polymerized from ethylenically unsaturated monomers in a polyahl without taking steps to react the polyahl with the monomers or the particles formed from the monomers. In this embodiment, however, some of the polyahl will usually have inherent unsaturation which allows it to copolymerize with the unsaturated monomers.

In an alternative embodiment, the copolymer-polyols of the instant invention include added ethylenic unsaturation in the polyahl. This embodiment causes functionally significant amounts of the resulting polymer particles to have covalent bonds with polyol molecules. The unsaturation may be added in either of two ways.

In a first method, the unsaturation is added to the polyahl by reacting the polyahl with a monomer (reactive monomer) bearing both an ethylenically unsaturated double bond, and a pendant moiety which is reactive with the active hydrogen of the polyahl. This product is called a "mono-adduct"; i.e., the adduct of a monomer and the polyahl. Although reactive monomers such as maleic anhydride and methacryloyl chloride may be suitably used, this reaction is most advantageous when the reactive monomer is an isocyanate monomer such as 2-isocyanatoethyl methacrylate (IEM) and the polyahl is a polyol. In this situation, the reaction is carried out in the presence of a urethane catalyst such as amine or an organometallic catalyst, preferably an organometallic catalyst such as stannous octoate, lead octoate, stannous acetate, dibutyltin dilaurate and tin and zinc thiolates. The conditions employed in carrying out the urethane reaction involve maintaining the reaction mixture of the polyahl and isocyanate monomer, preferably neat, or alternatively dissolved in a nonreactive solvent such as ethyl acetate, toluene or cellosolve acetate at a temperature from ambient to 140° C. in a vessel for a reaction time from a few seconds to about 24 hours. Also suitably employed are reactive solvents such as polyahl or other ethylenically unsaturated monomers. The equivalent ratio of isocyanate monomer to active hydrogen of the polyahl is desirably less than one. In the more preferred embodiments, very low NCO:active equivalent hydrogen ratios are employed, e.g., less than 0.2:1, most preferably 0.1:1 to 0.001:1. The resulting mono-adduct having pendant ethylenically unsaturated urethane group(s) is generally used without further purification. If a solvent has been used in the reaction, it can be removed, or the composition containing the solvent can be employed as is. This adduct can be blended with additional polyahl.

Alternatively, unsaturation may be added to the polyahl by reacting the polyahl with an addition copolymer (prepolymer) of a reactive monomer. This product is called a "poly-adduct", i.e., the adduct of a polymer and the polyahl. The adduct of (1) an addition copolymer of a reactive monomer with at least one other ethylenically unsaturated monomer, and (2) a polyahl, is beneficially prepared by first copolymerizing the reactive monomer with other monomer(s), and then reacting the copolymer with polyahl using the procedures and conditions described hereinbefore to react the reactive monomer with the polyahl. Preferably, the reactive monomer is an isocyanate monomer, as in the case of the mono-adduct.

Although the above discussion refers to making adducts with the "polyahl," it can be advantageous to use compounds which have actually only a single active hydrogen. Thus, for the purposes of adducts, the discussion of polyahls should be construed to also include "monoahls."

For the purposes of this invention, the term "isocyanate monomer" means a monomer having an isocyanate group and an ethylenically unsaturated group capable of undergoing free radical initiated addition polymerization as readily as an $\alpha,\beta$-ethylenically unsaturated isocyanate, preferably as readily as acryloyl. Representative isocyanates are the isocyanatoalkyl esters of $\alpha,\beta$-ethylenically unsaturated carboxylic acids, $\alpha,\beta$-ethylenically unsaturated isocyanates, monovinylidene aryl isocyanates and monovinylidene arylmethyl isocyanates, with the isocyanatoalkyl esters being preferred.

Exemplary isocyanatoalkyl esters include 2-isocyanatoethyl methacrylate, 2-isocyanoethyl acrylate, 3-isocyanatopropyl methacrylate, 1-methyl-2-isocyanatoethyl methacrylate and 1,1-dimethyl-2-isocyanatoethyl acrylate with 2-isocyanatoethyl methacrylate being most preferred. Suitable methods of preparing said isocyanato esters are well known, e.g., as shown in U.S. Pat. Nos. 2,718,516 and 2,821,544 and British Patent No. 1,252,099. Exemplary monovinylidene aromatic isocyanates and monovinylidene arylmethyl isocyanates include styrene isocyanate and vinylbenzyl isocyanate. Exemplary $\alpha,\beta$-ethylenically unsaturated isocyanates include vinyl isocyanate and isopropenyl isocyanate.

Suitable ethylenically unsaturated monomers (so-called other monomers or other ethylenically unsaturated monomers) which are polymerized to form copolymers with the aforementioned adducts or which are polymerized without adducts or adduct-forming monomers in the case of copolymer dispersions which do not have unsaturation added to the polyahl include aliphatic conjugated dienes such as butadiene and isoprene; monovinylidene aromatic monomers such as styrene, $\alpha$-methyl styrene, ar-methyl styrene, ar-(t-butyl)styrene, ar-chlorostyrene, ar-cyanostyrene and ar-bromostyrene; $\alpha,\beta$-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; $\alpha,\beta$-ethylenically unsaturated nitriles and amides such as acrylonitrile, methacrylonitrile, acrylamide, methacrylamide, N,N-dimethyl acrylamide, N-(dimethylaminomethyl)acrylamide, and the like; vinyl esters such as vinyl acetate; vinyl ethers; vinyl ketones; vinyl and vinylidene halides such as vinyl chloride and vinylidene chloride as well as a wide variety of other ethylenically unsaturated materials which are copolymerizable with the aforementioned adduct, many of which have heretofore been employed in the formation of copolymer polyols as described in U.S. Pat. Nos. 3,823,201 and 3,383,351. It is understood that mixtures of two or more of the aforementioned monomers are also suitably employed in making the copolymer. Of the foregoing monomers, the monovinylidene aromatic monomers, particularly styrene; the ethylenically unsaturated nitriles, particularly acrylonitrile; and the vinyl and vinylidene halides, particularly vinyl chloride and vinylidene chloride are especially desirable. Acrylonitrile, vinyl chloride and vinylidene chloride are preferred with acrylonitrile being most preferred.

Regarding monomer selection, there are two common commercially produced types of copolymer dispersions. One type is an "all acrylonitrile" dispersion which has as its principal ingredient only acrylonitrile or a similar behaving compound such as the vinyl and vinylidene halides. The other type is a "SAN" or "styrene-acrylonitrile" dispersion. These dispersions have acrylonitrile or a similar compound, and significant amounts (e.g., at least 10 percent by weight) of styrene or a similar behaving compound such as $\alpha$-methyl styrene, etc. Generally, the all acrylonitrile dispersions will have hard particles at 120° C. whereas the SAN dispersions will have soft particles at 120° C. The selection of the monomer system to use is often based on such factors as monomer cost, monomer availability, and the intended end use of the dispersion. While the process of the invention is suitable for use with either monomer system (or any other monomer system), particular advantage is obtained in all acrylonitrile systems. Specifically, when α,β-ethylenically unsaturated nitriles, vinyl halides or vinylidene halides are present as the principal ingredients, very surprising viscosity reductions may be achieved. By "principal ingredient" is meant that one of these monomers (or mixtures thereof) make up desirably at least 85 percent, more desirably at least 90 percent, preferably at least 95 percent, and most preferably 100 weight percent of the monomer charge, all percentages excluding any adducts of "reactive monomer" and polyahl, and any monomer present as a "reactive monomer" for adduct formation.

The amount of other ethylenically unsaturated monomer(s) employed in the copolymerization reaction is generally an amount sufficient to provide good reinforcement in urethane polymers and cell opening in urethane foams. In the case of a mono-adduct, the amount of the mono-adduct employed in the copolymerization reaction is an amount sufficient to produce a stable dispersion and provide particle size control. Preferably, the amount of the adduct employed is in the range from about 0.0002 to about 30, more preferably from about 0.005 to about 10, most preferably from about 0.02 to about 5, weight percent based on the weight of the copolymer dispersion. The total amount of monomers added generally is selected to give a total solids (prior to dilution) of desirably about 5 to about 70, preferably about 10 to about 50, most preferably about 15 to about 45 weight percent based on the weight of the dispersion. For maximum viscosity reduction potential, however, the total solids (undiluted) is desirably at least 15 percent, more desirably at least 20 percent, preferably at least 25 percent and most preferably at least 30 percent. For some dispersions, (e.g., SAN dispersions), the initial solids may need to be even higher (e.g., 35–45 percent) for adequate viscosity reduction potential.

Regardless of whether the dispersion is being prepared without added unsaturation in the polyahl or with unsaturation added in the form of a mono-adduct or a poly-adduct, the polymerization of the ethylenically unsaturated monomer(s) may proceed in a similar fashion. Preferably, the polymerization is a continuous addition batch reaction where the unsaturated ingredients and an initiator are continuously added, at a constant rate, with or without additional polyahl, to a closed (i.e., product is not removed) reaction vessel containing the polyahl. In the case of a mono-adduct, the reactive monomer is added to and reacted with the polyahl prior to the addition of the other monomers and addition polymerization catalyst. In the case of a poly-adduct, the reaction between the polyahl and the reactive monomer takes place after the polymerization.

The polymerization reaction takes place in a manner similar to other well-known addition polymerizations. The temperature of the copolymerization is dependent upon the initiator and is preferably in the range from about 25° to about 190° C., most preferably from about 110° to about 130° C., when azo-type catalysts are used. Alternatively, the free radical catalyst may be dispersed in a portion of the polyahl and thereafter added along with monomer to the remaining portion of the polyahl containing the mono-adduct.

Suitably, the concentration of polymerization catalyst is any amount sufficient to cause copolymerization. Preferably, however, the concentration of catalyst is in the range from about 0.1 to about 20, more preferably from about 0.5 to about 5, weight percent based on the combined weight of the monomer(s), including any mono-adduct in the weight of the monomers.

Catalysts suitably employed in the practice of the copolymerization are free radical type polymerization catalysts such as the peroxides, persulfates, perborates, percarbonates, azo compounds and the like. Examples of such catalysts include hydrogen peroxide, di(t-butyl)-peroxide, t-butyl peroctoate, t-butyl perbenzoate, lauroyl peroxide, cumene hydroperoxide, t-butyl hydroperoxide, azobis(isobutyronitrile) [AIBN] as well as mixtures of such catalysts. Of the foregoing catalysts, azobis(isobutyronitrile) and t-butyl peroctoate are preferred.

In addition to the foregoing catalysts, chain transfer agents such as mercaptans, e.g., dodecanethiol, and carbon tetrahalides such as carbon tetrachloride may be employed in conventional amounts to control molecular weight of the copolymerizate. Other polymerization processes, both continuous and batch, may be suitably employed.

The above description will enable those skilled in the art to prepare the undiluted dispersions used in the invention. However, other details concerning such preparation may be derived from the following patents: U.S. Pat. Nos. 3,405,162; 3,523,093; 3,652,639; 3,931,092; 4,014,846; 4,104,236; 4,108,954; 4,111,865; 4,119,586; 4,125,505; 4,148,840; 4,161,468; 4,172,825; 4,208,314; 4,242,249; RE 28,715; RE 29,014; RE 29,118; British Patent Nos. 1,063,222 and 1,129,284 and EPO Publication No. 30,307. Those relating specifically to dispersions wherein the polyol has been supplied with added ethylenic unsaturation include U.S. Pat. Nos. 3,652,639 and RE 29,014.

Preferably, after the copolymer dispersion is fully prepared, it is diluted to a lower solids concentration. This dilution may take place with any compatible polyahl, however, the same polyahl used to prepare the dispersion is preferred. While the dilution preferably occurs at any time after the copolymer dispersion is prepared, it most preferably occurs while the dispersion is still warm from the reaction, thus allowing better and easier mixing due to lower viscosity.

The dispersion is diluted with at least enough additional polyahl to cause a measurable reduction in viscosity. Preferably, however, the dispersion is diluted according to at least one of several measurement schemes.

In measuring dilution by the reduction in solids, the dispersion is diluted to reduce the solids concentration to desirably less than 95 percent, preferably less than 80 percent and most preferably less than 66 percent of its original solids. In measuring dilution by reduction in viscosity, enough polyahl is added to reduce the viscosity to desirably less than 90 percent, more desirably less than 60 percent, preferably less than 25 percent, and most preferably less than 10 percent of its original viscosity.

The resulting copolymer dispersion is readily reacted with an organic polyisocyanate to form desired polyurethane products using conventional polyurethane reaction conditions and procedures. Such reaction and procedures are optionally carried out in the presence of chain extending agents, catalysts, surface active agents, stabilizers, blowing agents, fillers and pigments. In the preparation of foamed polyurethane, suitable procedures for the preparation of same are disclosed in U.S. Pat. No. RE 24,514, which is incorporated herein by reference. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the graft copolymer dispersion of the present invention to prepare a prepolymer having free isocyanate groups which is then reacted in a second step with water to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride and methylene chloride may be used as blowing agents.

The foams may also be prepared by the froth technique as described in U.S. Pat. Nos. 3,755,212; 3,849,156 and 3,821,130 which are also incorporated herein by reference.

Organic polyisocyanates which may be employed include aromatic, aliphatic and cycloaliphatic polyisocyanates and combinations thereof. Representative of these types are the diisocyanates such as m-phenylene diisocyanate, tolylene-2,4-diisocyanate, tolylene-2,6-diisocyanate hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4'-triphenylmethane triisocyanate, polymethylene polyphenylisocyanate and tolylene-2,4,6-triisocyanate; and the tetraisocyanates such as 4,4'-dimethyldiphenylmethane-2,2',5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the practice of the present invention, such as crude toluene diisocyanate obtained by the phosgenation of a mixture of toluene diamines or crude diphenylmethylene diisocyanate obtained by the phosgenation of crude diphenylmethylenediamine. The preferred undistilled or crude isocyanates are disclosed in U.S. Pat. No. 3,215,652.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols or mixtures thereof. A preferred group of chain-extending agents includes water and primary and secondary aromatic diamines which react more readily with the isocyanate than does water such as phenylenediamine, bis(3-chloro-4-aminophenyl)methane, 2,4-diamino-3,5-diethyl toluene, tri-secondary butanolamine, isopropanolamine, diisopropanolamine, N-(2-hydroxypropyl)ethylenediamine, and N,N'-di(2-hydroxypropyl)ethylenediamine.

The urethane reaction of polyisocyanate with the copolymer dispersion is advantageously carried out in the presence of an amount of urethane-type catalyst which is effective to catalyze reaction of the polyahl of the copolymer dispersion with the polyisocyanate. Preferably, the amount of urethane catalyst is an amount comparable to that used in conventional urethane-type reactions.

Any suitable urethane catalyst may be used including tertiary amines, such as for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropyl amine, N,N-dimethyl-N',N'-methyl isopropyl propylenediamine, N,N-diethyl-3-diethylaminopropyl amine, dimethyl benzyl amine and the like. Other suitable catalysts are, for example, tin compounds such as stannous chloride, tin salts of carboxylic acids such as dibutyltin di-2-ethyl hexoate, as well as other organometallic compounds such as are disclosed in U.S. Pat. No. 2,846,408.

A wetting agent(s) or surface-active agent(s) is generally necessary for production of high grade polyurethane foam according to the present invention, since in the absence of same, the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters and alkyl arylsulfonic acids.

The copolymer polyahl dispersions of the invention are also useful in the production of isocyanurate foams. These foams are generally more rigid than urethane foams and are principally used as thermal insulation. The production of such foams from a copolymer polyahl and other materials is well known to those skilled in the art. Representative teachings are contained in the following U.S. Pat. Nos. 4,111,914; 3,516,950; 4,169,921; 3,940,517; 4,173,692; 4,256,846; 4,256,802; RE 30,760; 4,302,551; 4,208,320; 4,289,858; 4,292,363; 4,292,361; 4,284,730.

Further details of the invention will become apparent from the following examples which are presented for purposes of illustrating the invention. In the examples, all parts and percentages are by weight unless otherwise stated.

ACRYLONITRILE POLYMER-POLYOL WITH NO ADDED UNSATURATION

Comparative Example 1—Preparation to 20 Percent Solids

A glycerine initiated polyalkylene polyol made from propylene oxide and ethylene oxide and having a hydroxyl number of 31.7 to 36.3, hereinafter referred to as Polyol I, (535 g, 0.11 mole), is charged into a two-liter, round-bottom flask equipped with a stirrer, condenser, addition funnel, thermocouple and nitrogen sparge. The polyol is heated to 115° C. with stirring, and a solution of acrylonitrile (250 g), azobisisobutyronitrile (3.6 g) and Polyol I (535 g) is added over a 75-minute period. After an additional hour, the product is stripped under vacuum for 2 hours. The final product is a creamy yellow dispersion having a Brookfield viscosity (Spindle No. 3, 10 rpm, 25° C.) of 6,515 cps.

Example 1—Preparation to 30 Percent Solids with Dilution to 20 Percent Solids Polyol I (200 g) is charged into a two-liter flask as described in Comparative Example 1. The polyol is heated to 115° C. and a mixture of acrylonitrile (430 g), azobisisobutyronitrile (6.2 g) and Polyol I (800 g) is added over a 75-minute period while stirring. After reacting for an additional hour, the product is stripped for 2 hours. The final product is a yellow dispersion having a Brookfield viscosity (Spindle No. 4, 5 rpm, 25° C.) of 33,250 cps. A portion of this product is diluted with additional Polyol I to 20 percent solids. The diluted product has a Brookfield viscosity (Spindle No. 3, 20 rpm, 25° C.) of 3,595 cps.

ACRYLONITRILE POLYMER-POLYOLS WITH MALEIC ANHYDRIDE ADDED UNSATURATION

Comparative Example 2—Preparation to 20 Percent Solids

Polyol I (528 g) and maleic anhydride capped Polyol I (132 g of a 1:1 molar adduct of maleic anhydride and Polyol I, described in Example 1 of U.S. Pat. RE 29,014) is charged into a two-liter flask as described in Comparative Example 1. The polyol mixture is heated to 115° C. and a mixture of acrylonitrile (250 g), azobisisobutyronitrile (6.2 g), Polyol I (255 g) and maleic anhydride capped Polyol I (23 g) is added slowly over a two-hour period. The reaction is finished off as in Comparative Example 1. The final product is a yellow dispersion having a Brookfield viscosity (Spindle No. 5, 5 rpm, 25° C.) of 48,224 cps.

Example 2—Preparation to 30 Percent Solids with Dilution to 20 Percent Solids Polyol I (332 g) and maleic anhydride capped Polyol I (83 g, as previously described) is charged into a two-liter flask as described in Comparative Example 1. The polyol mixture is heated to 115° C. and a mixture of acrylonitrile (430 g), azobisisobutyronitrile (10.7 g), Polyol I (451 g) and maleic anhydride capped Polyol I (134 g, as previously described) is added slowly over a three-hour period. The reaction is finished off in the same manner as described in Comparative Example 1. The final product is a yellow dispersion having a Brookfield viscosity (Spindle No. 3, 1 rpm, 25° C.) of 67,250 cps. A portion of this product is diluted with additional Polyol I to 20 percent solids. The diluted product has a Brookfield viscosity (Spindle No. 3, 10 rpm, 25° C.) of 3,970 cps.

ACRYLONITRILE POLYMER-POLYOLS WITH IEM ADDED UNSATURATION; MONO-ADDUCT

Comparative Example 3—Preparation to 20 Percent Solids

Polyol I (547 g) is charged to a two-liter flask as described in Comparative Example 1. The polyol is heated to 115° C. and a mixture of acrylonitrile (250 g), azobisisobutyronitrile (3.6 g), Polyol I (453 g) and the adduct of 2-isocyanatoethyl methacrylate and a butanol initiated polypropylene oxide glycol ether having a Saybolt viscosity of 317 seconds and a hydroxyl number of 19.52 (hereinafter referred to as Polyol II though referred to as a "polyol," the majority of molecules are mono active-hydrogen), 16 g of a 70 percent capped adduct; is added slowly over a 70-minute period. The reaction is finished off in the same manner as described in Comparative Example 1. The final product is a yellow dispersion having a Brookfield viscosity (Spindle No. 3, 5 rpm, 25° C.) of 15,130 cps.

Example 3—Preparation to 30 Percent Solids with Dilution to 20 Percent Solids Polyol I (200 g) is charged into a two-liter flask as described in Comparative Example 1. The polyol is heated to 115° C. and a mixture of acrylonitrile (430 g), azobisisobutyronitrile (6.2 g), Polyol I (780 g) and IEM capped Polyol II (16 g, as previously described) is slowly added over an 80-minute period. The reaction is finished off as in Comparative Example 1. The final product is a yellow dispersion having a Brookfield viscosity (Spindle No. 6, 20 rpm, 25° C.) of 17,150 cps. A portion of this material is diluted with additional Polyol I to 20 percent solids. The diluted product has a Brookfield viscosity (Spindle No. 3, 20 rpm, 23° C.) of 3,060 cps.

ACRYLONITRILE POLYMER-POLYOLS WITH IEM ADDED UNSATURATION; POLY-ADDUCT

Comparative Example 4—Preparation to 20 Percent Solids

Polyol I (650 g) and 2-isocyanatoethyl methacrylate capped Polyol I (100 g of a 0.2 mole IEM/1.0 mole polyol, capped material) is charged to a two-liter flask as described in Comparative Example 1. The polyol mixture is heated to 115° C. and a mixture of acrylonitrile (250 g), azobisisobutyronitrile (5 g) and Polyol I (350 g) is added slowly over a 90-minute period. The reaction is finished off in the same manner as described in Comparative Example 1. The final product is a yellow dispersion having a Brookfield viscosity (Spindle No. 3, 5 rpm, 25° C.) of 14,920 cps.

Example 4—Preparation to 30 Percent Solids with Dilution to 20 Percent Solids Polyol I (298 g) and IEM capped Polyol I (100 g as previously described) is charged into a two-liter flask as described in Comparative Example 1. The polyol mixture is heated to 115° C. and a mixture of acrylonitrile (540 g), azobisisobutyronitrile (8.6 g) and Polyol I (602 g) is added over a two-hour period while mixing. The reaction is finished off in the same manner as described in Comparative Example 1. The final product is a yellow dispersion having a Brookfield viscosity (Spindle No. 3, 2½ rpm, 25° C.) of 23,120 cps. A portion of this product is diluted with additional Polyol I to 20 percent solids. The diluted product has a Brookfield viscosity (Spindle No. 3, 10 rpm, 25° C.) of 3,615 cps.

STYRENE-ACRYLONITRILE POLYMER-POLYOL WITH IEM ADDED UNSATURATION

Comparative Example 5—Preparation to 20 Percent Solids

A glycerine initiated polyalkylene oxide polyol made from propylene oxide and ethylene oxide and having a hydroxyl number of 54.4 to 58.4, hereinafter referred to as "Polyol III" (615 g), and IEM capped Polyol I (100 g as described in Comparative Example 4) is charged into a two-liter flask as described in Comparative Example 1. The polyol mixture is heated to 125° C. and a mixture of acrylonitrile (146 g), styrene (49 g), azobisisobutyronitrile (3.9 g) and Polyol III (60 g) is added over a 90-minute period. After reacting an additional 45 minutes, the product is stripped of volatiles under vacuum. The final product is an amber dispersion having a Brookfield viscosity (Spindle No. 3, 10 rpm, 25° C.) of 1,300 cps.

Example 5—Preparation to 45 Percent Solids with Dilution to 20 Percent Solids

Polyol III (475 g) and IEM capped Polyol I (100 g, as described in Comparative Example 4) is charged to a two-liter flask as described in Comparative Example 1. The polyol mixture is heated to 125° C. with stirring. A mixture of acrylonitrile (487.5 g), azobisisobutyronitrile (13 g), styrene (162.5 g) and Polyol III (200 g) is added over a period of one hour and 20 minutes. The reaction is finished off in the same manner as described in Comparative Example 5. The final product is an amber dispersion having 45 percent solids and a Brookfield viscosity (Spindle No. 2, 5 rpm, 25° C.) of 13,780 cps. A portion of this product is diluted with additional Polyol III to 20 percent solids. The diluted product has a Brookfield viscosity (Spindle No. 3, 10 rpm, 25° C.) of 1,050 cps.

TABLE I

| Example | Monomers | Unsaturation | Dilution | Solids | Viscosity |
|---|---|---|---|---|---|
| C-1[1] | acrylonitrile | none | no | 20 | 6,515 |
| 1 | acrylonitrile | none | no | 30 | 33,250 |
| 1 | acrylonitrile | none | yes | 20 | 3,595 |
| C-2[1] | acrylonitrile | maleic anhydride | no | 20 | 48,224 |
| 2 | acrylonitrile | maleic anhydride | no | 30 | 67,250 |
| 2 | acrylonitrile | maleic anhydride | yes | 20 | 3,970 |
| C-3[1] | acrylonitrile | IEM | no | 20 | 15,130 |
| 3 | acrylonitrile | IEM | no | 30 | 17,150 |
| 3 | acrylonitrile | IEM | yes | 20 | 3,060[2] |
| C-4[1] | acrylonitrile | IEM | no | 20 | 14,920 |
| 4 | acrylonitrile | IEM | no | 30 | 23,120 |
| 4 | acrylonitrile | IEM | yes | 20 | 3,165 |
| C-5[1] | SAN | IEM | no | 20 | 1,300 |
| 5 | SAN | IEM | no | 45 | 13,780 |
| 5 | SAN | IEM | yes | 20 | 1,505 |

[1]Not an example of the invention.
[2]23° C. (Others at 25° C.)

Example 6

Using the diluted copolymer polyol of Example 3, a polyurethane foam is prepared according to the following procedure. A urethane foam formulation is prepared which consists of 63.3 weight parts of Polyol I, 36.7 parts of the copolymer dispersion (20 percent solids), 3.3 parts of water, 0.7 part of a nonhydrolyzable organosilicon surfactant sold by Union Carbide under the designation L 5303, 0.04 part of a poly(dimethylsilicone) surfactant sold by Dow Corning under the designation DCF-1-1630, 0.185 part of triethylene diamine, 0.1 part of a 70 percent solution of bis(N,N-dimethylaminoethyl) ether in dipropylene glycol, 0.15 part of N,N-dimethylethanolamine, 0.005 part of an alkyltin catalyst sold by Witco Chemical under the designation of UL-1 and 39.4 parts of a mixture of 80 percent toluene diisocyanate (80/20 mixture of 2,4-isomer and 2,6-isomer) and 20 percent polymethylene polyphenyl isocyanate sold by Mobay Chemical under the trade name Mondur MR. The foregoing ingredients, except the isocyanate, are placed into a metal cup and vigorously mixed (1800 rpm) for 25 seconds. The isocyanate is then added with further mixing (2000 rpm) for 2 seconds. The foaming mixture is then poured into a waxed aluminum mold (38.1 cm×38.1 cm×11.4 cm) which has been preheated to ~135° F. The mold containing the foam is then placed into an oven preheated to 250° F. for 4.5 minutes. The foam is removed from the mold, crushed and conditioned for one week at constant temperature and humidity. The resulting polyurethane foam exhibits physical properties comparable to conventional polyurethane foams made using conventional polymer polyols, e.g., those described in U.S. Pat. No. 3,823,201.

Example 7

Diethylene glycol (600 g) is charged into a two-liter flask as described in Comparative Example 1. The flask is heated to 115° C. and a mixture of acrylonitrile (420 g), AIBN (8.6 g) and diethylene glycol (600 g) is added slowly over a two-hour period. The reaction is finished off in the same manner as described in Comparative Example 1. The dispersion is diluted with additional diethylene glycol (590 g) to 20 percent solids. The final product is a yellow dispersion having a Brookfield viscosity (Spindle No. 3, 10 rpm, 25° C.) of 1,340 cps.

Example 8

Using the diluted copolymer dispersion of Example 7, a urethane-modified isocyanurate foam is prepared as follows. The product of Example 7 (43.1 g) is blended with tris(dimethylaminomethyl)phenol (6 g), potassium acetate (1 g), a poly(dimethylsilicone) surfactant (3 g) sold by Dow Corning, Midland, MI, U.S.A., under the trade name DC 193, and Freon® 11 (55 g) (a chlorofluorocarbon available from E. I. DuPont, Wilmington, Delaware, U.S.A.). After vigorously mixing (1,800 rpm) for 10 seconds, polymeric isocyanate (280 g) sold by Mobay Chemical Corp., Pittsburg, PA, U.S.A., under the trade name Mondur MR, is added with further mixing for 2 seconds. The foaming mixture is poured into a 2-gallon paper bucket. The result is a rigid foam having a density of 1.66 lb/ft$^3$, a friability of 26.5 percent and a K-factor (BTU.in.h$^{-1}$.f$^{-2}$.°F.$^{-1}$) (heat transmission) of 0.137, (0.0198 W.m$^{-1}$.K$^{-1}$).

What is claimed is:

1. A method of making a polymer dispersion in a polyahl comprising (a) a first step of addition polymerizing monomer to form polymer particles in a polyahl medium to a first solids concentration; and (b) a second step of diluting, the dispersion obtained in step (a) with a polyahl to a second lower solids concentration, thereby obtaining a dispersion having a lower viscosity than if the polymer dispersion were prepared directly to said second solids concentration.

2. The method of claim 1 wherein the polymer particles are polymerized from acrylonitrile, styrene, or a mixture of acrylonitrile and styrene.

3. The method of claim 1 wherein the polymer particles are prepared from acrylonitrile, a vinyl halide, a vinylidene halide, or mixtures thereof.

4. The method of claim 3 wherein the polymer particles are formed from acrylonitrile.

5. The method of claim 1 wherein the polyahl is a polyol.

6. The method of claim 4 wherein the polyahl is a polyol.

7. The method of claim 1 wherein the polyahl contains added unsaturation.

8. The method of claim 7 wherein the polyahl is reacted with a reactive compound before the polymerization of the polymer particles.

9. The method of claim 7 wherein the polymer particles are polymerized from a reactive compound and at least one other addition polymerizable compound and the polymer particles are then reacted with the polyahl through the reactive moiety of the reactive compound.

10. The method of claim 1 wherein the dispersion is prepared to an initial solids of at least 25 weight percent.

11. The method of claim 1 wherein the dilution reduces the solids of the dispersion to less than 80 weight percent of its original solids.

12. The method of claim 1 wherein the dilution reduces the viscosity of the dispersion to less than 60 percent of its original viscosity.

13. The method of claim 6 wherein the dispersion is prepared to an initial solids of at least 25 weight percent, and the dilution reduces the solids to less than 80 weight percent of the original solids and reduces the viscosity to less than 60 percent of the original viscosity.

14. A polymer dispersion prepared by the method of claim 1, 2, 3, 4, 5, 6, 7, 8, 9, 10, 11, 12 or 13.

15. A urethane-type composition obtained from the reaction of a diisocyanate and the polymer dispersion produced by the method of claim 1.

16. An isocyanurate foam prepared from the polymer dispersion produced by the method of claim 1.

* * * * *